US012654458B2

(12) United States Patent
Zhao et al.

(10) Patent No.: US 12,654,458 B2
(45) Date of Patent: Jun. 16, 2026

(54) INK CARTRIDGE PACKAGING ASSEMBLY, AND INK CARTRIDGE ASSEMBLY

(71) Applicant: SPEED INFOTECH (BEIHAI) COMPANY LIMITED, Beihai (CN)

(72) Inventors: Chenhai Zhao, Beihai (CN); Zhanbei Wang, Beihai (CN); Jinghua He, Beihai (CN); Guangfu Wang, Beihai (CN)

(73) Assignee: SPEED INFOTECH (BEIHAI) COMPANY LIMITED, Beihai (CN)

( * ) Notice: Subject to any disclaimer, the term of this patent is extended or adjusted under 35 U.S.C. 154(b) by 475 days.

(21) Appl. No.: 18/258,387

(22) PCT Filed: Dec. 13, 2021

(86) PCT No.: PCT/CN2021/137480
§ 371 (c)(1),
(2) Date: Jan. 11, 2024

(87) PCT Pub. No.: WO2022/135211
PCT Pub. Date: Jun. 30, 2022

(65) Prior Publication Data

US 2024/0351339 A1 Oct. 24, 2024

(30) Foreign Application Priority Data

Dec. 21, 2020 (CN) ......................... 202011520962.1

(51) Int. Cl.
*B41J 2/175* (2006.01)

(52) U.S. Cl.
CPC ....... *B41J 2/17533* (2013.01); *B41J 2/17536* (2013.01); *B41J 2/17559* (2013.01); *B41J 2/17503* (2013.01); *B41J 2/1754* (2013.01)

(58) Field of Classification Search
CPC ................ B41J 2/17533; B41J 2/17536; B41J 2/17559; B41J 2/17503; B41J 2/1754;
(Continued)

(56) References Cited

U.S. PATENT DOCUMENTS

| | | | | |
|---|---|---|---|---|
| 5,934,475 A * | 8/1999 | Hikake | B41J 2/17533 206/461 |
| 7,556,146 B2 * | 7/2009 | Takata | B65D 81/113 206/521 |
| 2016/0016412 A1 | 1/2016 | Mizutani et al. | |

FOREIGN PATENT DOCUMENTS

| | | |
|---|---|---|
| CN | 201998563 U | 10/2011 |
| CN | 206485052 U | 9/2017 |

(Continued)

OTHER PUBLICATIONS

International Search Report dated Mar. 9, 2022, PCT Application No. PCT/CN2021/137480, 12 pages (including English translation).

(Continued)

*Primary Examiner* — Geoffrey S Mruk
(74) *Attorney, Agent, or Firm* — MH2 Technology Law Group LLP

(57) ABSTRACT

An ink cartridge packaging assembly and an ink cartridge assembly, with a surface of an ink cartridge having a first region, the ink cartridge packaging assembly including a first housing, wherein the first housing is internally provided with an accommodating cavity for accommodating at least one ink cartridge; the first housing is provided with at least one first opening; the first opening is in communication with the accommodating cavity; and the first opening is disposed opposite the first region. The ink cartridge assembly includes the ink cartridge and the ink cartridge packaging assembly, the ink cartridge being loaded in the ink cartridge packaging assembly. When an on-chip program is upgraded, the upgrade can be simply performed by directly electrically
(Continued)

connecting a probe module to a conductive plate via a first opening, thereby saving on labor costs and time costs during the upgrade.

12 Claims, 9 Drawing Sheets

(58) Field of Classification Search
CPC ...... B65D 77/00; B65D 77/003; B65D 77/02; B65D 77/08; B65D 77/22
See application file for complete search history.

(56) References Cited

FOREIGN PATENT DOCUMENTS

| | | | |
|---|---|---|---|
| CN | 207329311 | U | 5/2018 |
| CN | 207361007 | U | 5/2018 |
| CN | 207764354 | U | 8/2018 |
| CN | 209176328 | U | 7/2019 |
| CN | 209274166 | U | 8/2019 |
| CN | 111196090 | A | 5/2020 |
| CN | 112537139 | A | 3/2021 |
| CN | 214449540 | A | 3/2021 |
| CN | 112874169 | A | 6/2021 |
| CN | 112976818 | A | 6/2021 |
| CN | 214395987 | U | 10/2021 |
| JP | H10250094 | A | 9/1998 |
| JP | 2006213372 | A | 8/2006 |
| JP | 2016022607 | A | 2/2016 |
| JP | 2017013395 | A | 1/2017 |
| JP | 2017161656 | A | 9/2017 |
| WO | 2021173603 | A1 | 9/2021 |

OTHER PUBLICATIONS

Written Opinion of the International Searching Authority issued in International Patent Application No. PCT/CN2021/137480, dated Mar. 9, 2022, with English translation, 9 pages.
Extend European Search Report issued in European Patent Application No. EP21909208.7 mailed on Apr. 26, 2024, 4 pages.
First 1st Notice of Reasons for Refusal issued in Japanese Patent Application No. JP2023-537947 mailed on Mar. 5, 2024, 6 pages, including English translation.
First Office Action issued in European Patent Application No. EP21909208.7 mailed on May 13, 2024, 7 Pages.
Search Report issued in related Chinese Patent Application No. CN202011520962.1 mailed on Jul. 5, 2024, English translation attached.
First Office Action issued in related Chinese Patent Application No. CN202011520962.1 mailed on Jul. 7, 2024, English translation attached.

* cited by examiner

INK CARTRIDGE PACKAGING ASSEMBLY, AND INK CARTRIDGE ASSEMBLY

The present application is a national phase entry of PCT/CN2021/137480 filed Dec. 13, 2021 and published as WO 2022/135211 on Jun. 30, 2022, which claims the priority to Chinese Patent Application 202011520962.1 filed on Dec. 21, 2020, the contents of all of which are incorporated herein by reference in their entireties.

TECHNICAL FIELD

The present disclosure relates to an ink cartridge packaging assembly and an ink cartridge assembly.

BACKGROUND

An ink cartridge of a printer is equipped inside with a chip for recording data such as the amount of ink remaining in the ink cartridge. A first region on the outer surface of the ink cartridge is fixed with a conductive plate, which is connected to the pins of the chip, and the printer reads the information recorded in the chip through the conductive plate during use: in addition, the printer can also write programs to the chip through the conductive plate. After the ink cartridges have been produced in the factory, they are packed into the packaging box. If the program built into the ink cartridge chip needs to be upgraded at this time, an operator needs to take the ink cartridges out of the packaging box one by one, then electrically connect a probe module to the conductive plate, and put the ink cartridges back into the packaging box one by one after the program upgrade is completed. In this way, when upgrading the ink cartridges in batches, it is required to repeatedly take the ink cartridges out of the packaging box and put the ink cartridges back, which is a huge workload and consumes a lot of labor costs and time costs.

CONTENT OF THE PRESENT INVENTION

The technical problem to be solved by the present disclosure is to provide an ink cartridge packaging assembly and an ink cartridge assembly in order to overcome the defect in the prior art that the ink cartridge needs to be taken out of the packaging box when upgrading the ink cartridge, resulting in a lot of time costs.

The present disclosure solves the above technical problem by the following technical solutions:

an ink cartridge packaging assembly, with a surface of the ink cartridge having a first region, the ink cartridge packaging assembly comprising a first housing and a sealing film, the first housing being internally provided with an accommodating cavity for accommodating at least one of the ink cartridges, wherein the first housing is provided with at least one first opening, the first opening is in communication with the accommodating cavity, the first opening is disposed opposite the first region, the sealing film is sealed and wrapped around the outside of the ink cartridge and located inside the first housing, and there is a gap between the sealing film and the first region.

In this solution, the success rate of a probe module in piercing the sealing film is improved by providing the first opening in the first housing for packaging the ink cartridge, with the first opening disposed opposite the first region of the ink cartridge and the outside of the ink cartridge wrapped with the sealing film, while providing a gap between the sealing film and the first region.

Preferably, the accommodating cavity accommodates several ink cartridges, and each of the first openings is disposed opposite at least one of the first regions.

In this solution, the first opening may correspond to the first region on one ink cartridge, or may correspond to the first regions on a plurality of ink cartridges. When the accommodating cavity is able to accommodate a plurality of ink cartridges, and a plurality of the first regions are disposed opposite the first opening, for the case where one first housing is internally provided with a plurality of ink cartridges, internal programs of the plurality of ink cartridges in the first housing can be upgraded without taking the plurality of ink cartridges out of the first housing.

Preferably, the ink cartridge packaging assembly further comprises at least one second housing, the second housing is disposed in the accommodating cavity, and the second housing is wrapped around the outside of at least one of the ink cartridges; the second housing does not overlap with the first region on the surface of the ink cartridge, and the sealing film is wrapped around the outside of the second housing.

In this solution, the protective effect of the ink cartridge packaging assembly on the ink cartridge is enhanced by setting the second housing to wrap around the ink cartridge, with the second housing not overlapping with the first region of the ink cartridge, the second housing being used to fix one or more ink cartridges, and provided in the first housing, and the sealing film is wrapped around the outside of the second housing and the second housing causes the gap between the sealing film and the first region, which improves the success rate of the probe module in piercing the sealing film.

Preferably, the second housing is provided with a second opening, the second opening is in communication with the inside of the second housing, and the second opening is disposed opposite the first region.

In this solution, by providing the second opening in the second housing, with the second opening disposed opposite the first region, when upgrading the ink cartridges installed in the second housing and the first housing, the upgrading device can be electrically connected to the first region through the first opening and the second opening to realize the upgrade without taking the ink cartridges out of the second housing and the first housing, thereby saving on labor costs and time costs.

Preferably, the gap between the sealing film and the first region is not less than 1 mm.

In this solution, by setting the gap between the sealing film and the first gap to not less than 1 mm, the success rate of the probe module in piercing the sealing film is improved.

Preferably, the gap between the sealing film and the first region is 1.5 mm to 3 mm.

In this solution, by setting the gap between the sealing film and the first gap to 1.5 mm to 3 mm, the success rate of the probe module in piercing the sealing film is improved.

Preferably, the sealing film is a heat shrinkable film.

In this solution, a heat shrinkable film is used as the sealing film, thereby simplifying the production process, and the sealing film can be sealed and wrapped around the first housing or the second housing or the ink cartridge only by heating.

Preferably, the heat shrinkable film is a POF film.

In this solution, a POF film is selected as the heat shrinkable film, and the POF film has the advantages of low cost, good moisture resistance performance, high strength, good cold resistance, easy processing and good safety.

An ink cartridge assembly, wherein the ink cartridge assembly comprises an ink cartridge and an ink cartridge packaging assembly as described above, and the ink cartridge is loaded in the ink cartridge packaging assembly.

In this solution, the ink cartridge is loaded in the ink cartridge packaging assembly, which protects the ink cartridge, and there is an opening in the ink cartridge packaging assembly, which is convenient for upgrading a chip inside the ink cartridge.

Preferably, the first region is provided with a conductive plate, and the conductive plate is connected to the chip inside the ink cartridge.

On the basis of common knowledge in the art, each of the above preferred conditions can be combined in any way to obtain each preferred embodiment of the present disclosure.

The positive progressive effect of the present disclosure is that:

for the ink cartridge packaging assembly and the ink cartridge assembly of the present disclosure, by providing the first opening on the first housing, with the first opening corresponding to a conductive plate of the chip built in the ink cartridge, when an on-chip program is upgraded, the upgrade can be simply performed by directly electrically connecting the probe module to the conductive plate via the first opening without taking the ink cartridge out of the first housing, thereby saving on labor costs and time costs during the upgrade.

Figure 1:
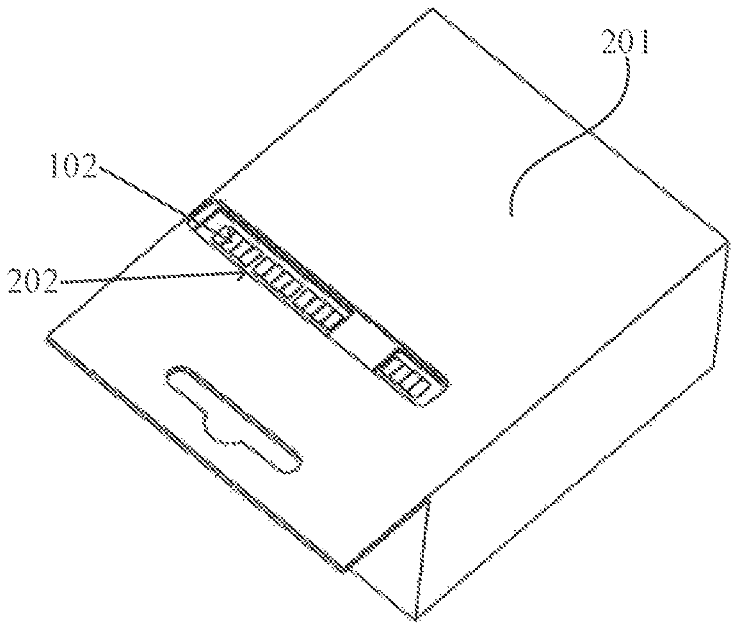
FIG. 1 shows a structural schematic diagram of an ink cartridge packaging assembly according to the present disclosure.

DESCRIPTION OF THE REFERENCE NUMERALS ink cartridge 1
first region 101
conductive plate 102
ink cartridge packaging assembly 2
first housing 201
first opening 202
second housing 203
second opening 204
sealing film 205
probe module 3

DETAILED DESCRIPTION OF THE PREFERRED EMBODIMENT

The present disclosure is more clearly and completely illustrated below by means of embodiments in conjunction with the drawings, but the present disclosure is not thereby limited to the scope of the embodiments.

Embodiment 1

As shown in FIG. 1, the present disclosure provides an ink cartridge packaging assembly 2, a surface of an ink cartridge 1 has a first region 101, the ink cartridge packaging assembly 2 comprises a first housing 201 and a sealing film 205, the first housing 201 is internally provided with an accommodating cavity for accommodating at least one ink cartridge 1, the first housing 201 is provided with at least one first opening 202, the first opening 202 is in communication with the accommodating cavity, and the first opening 202 is disposed opposite the first region 101. The sealing film 205 is sealed and wrapped around the outside of the ink cartridge 1 and located inside the first housing 201, and there is a gap between the sealing film 205 and the first region 101. The first region 101 is provided with a conductive plate 102, and the conductive plate 102 is connected to a chip inside the ink cartridge 1.

The ink cartridge 1 is equipped inside with a chip, and the chip is used to record information such as the ink remaining in the ink cartridge 1. The first region 101 on the surface of the ink cartridge 1 is provided with the conductive plate 102, and the conductive plate 102 is connected to the pins of the chip. During use, a printer reads the information stored in the chip through the conductive plate 102, and may also electrically connect an external device such as a probe module 3 to the conductive plate 102 to read data from the chip or write data to the chip. The ink cartridge packaging assembly 2 comprises the first housing 201, and the first housing 201 is internally provided with the accommodating cavity. The accommodating cavity may accommodate a single ink cartridge 1 or a plurality of ink cartridges 1 side by side. The surface of the first housing 201 is provided with a rectangular first opening 202. When the ink cartridge 1 is installed in the first housing 201, the first opening 202 is disposed opposite the first region 101 where the conductive plate 102 is installed on the surface of the ink cartridge 1. When the built-in program of the ink cartridge 1 is upgraded, the device can be electrically connected to the first region 101 through the first opening 202 to realize the upgrade without taking the ink cartridge 1 out of the first housing 201, thereby saving on labor costs and time costs. The sealing film 205 is wrapped around the ink cartridge 1, and there is a gap between the sealing film 205 and the ink cartridge 1, which improves the success rate of the probe module 3 in piercing the sealing film 205.

The accommodating cavity accommodates several ink cartridges 1, and a plurality of the first regions 101 are disposed opposite a first opening 202.

The accommodating cavity may accommodate several ink cartridges 1, the several ink cartridges 1 are arranged side by side in the accommodating cavity of the first housing 201, and the first regions 101 of the several ink cartridges 1 are disposed side by side. The first housing 201 is provided with the first opening 202, and the range of the first opening 202 covers all the contiguous regions of the first regions 101.

The ink cartridge packaging assembly 2 further comprises at least one second housing 203, the second housing 203 is disposed in the accommodating cavity, and the second housing 203 is wrapped around the outside of at least one ink cartridge 1: the second housing 203 does not overlap with the first region 101 on the surface of the ink cartridge 1, and the sealing film 205 is wrapped around the outside of the second housing 203.

Figure 2:
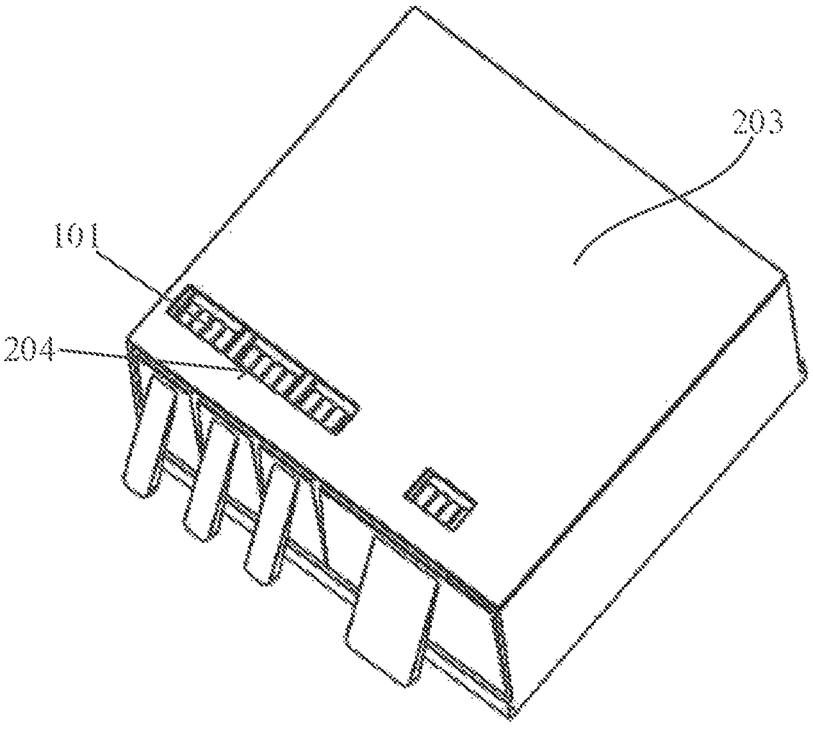
FIG. 2 shows a structural schematic diagram of a second housing according to the present disclosure.
Figure 7:
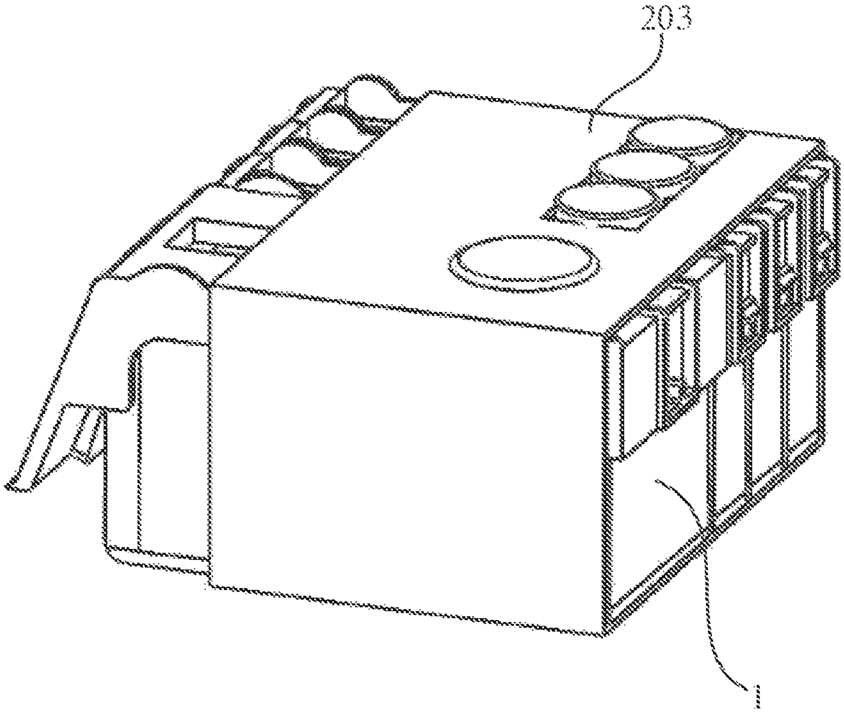
FIG. 7 shows a structural schematic diagram of another second housing according to the present disclosure.
Figure 8:
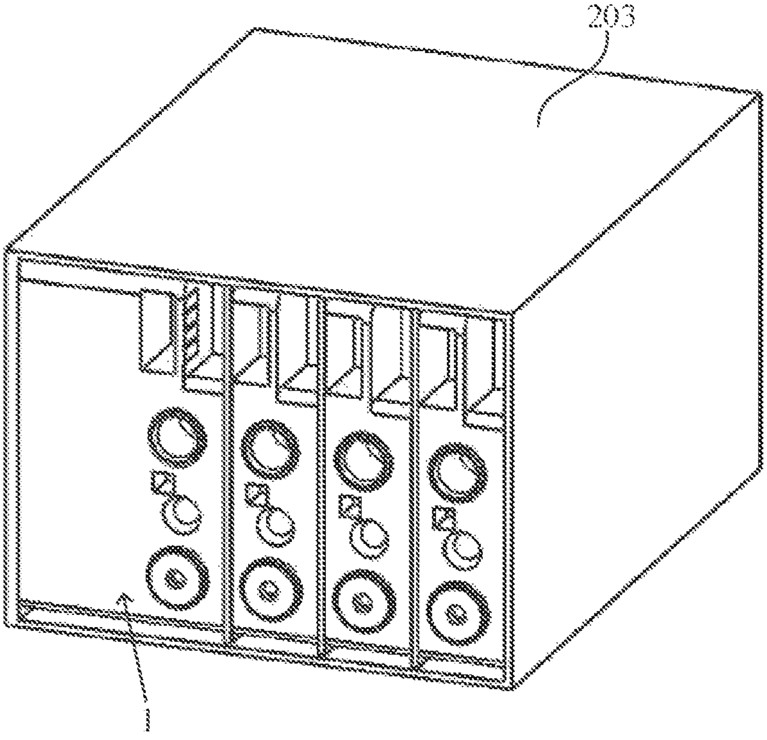
FIG. 8 shows a structural schematic diagram of a second housing according to the present disclosure.
Figure 9:
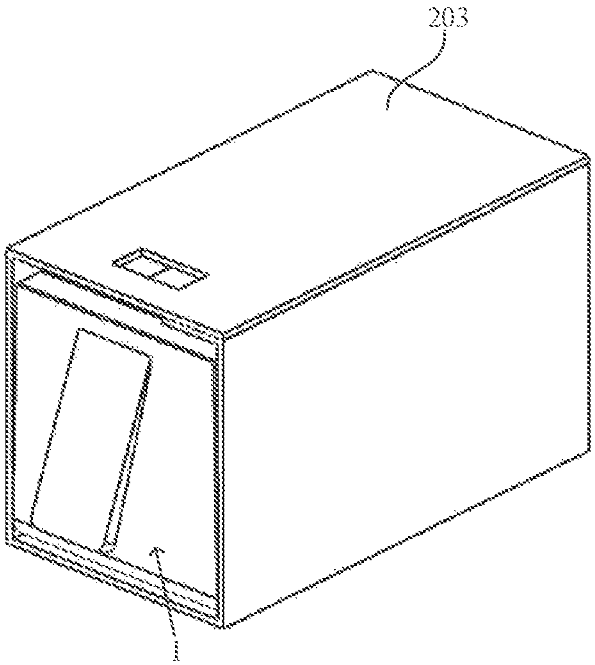
FIG. 9 shows a structural schematic diagram of a second housing according to the present disclosure.
Figure 10:
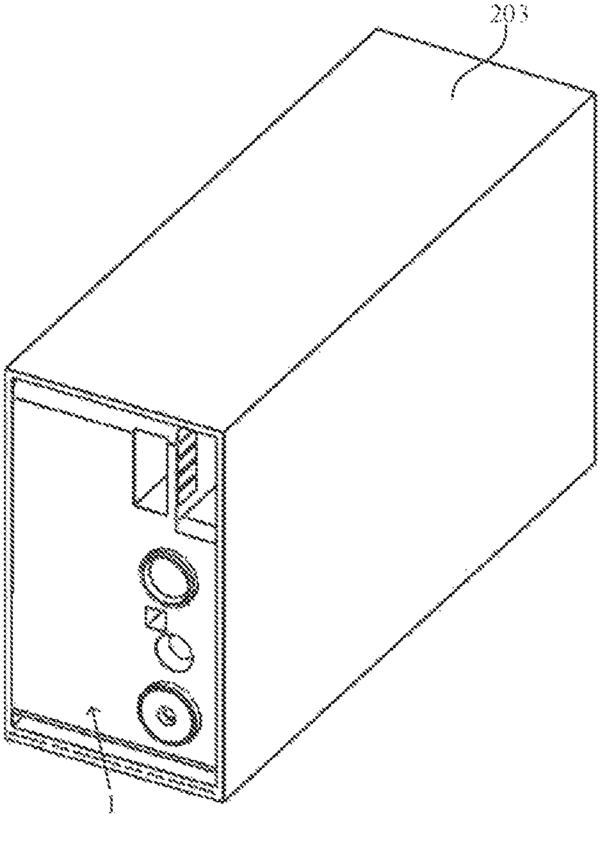
FIG. 10 shows a structural schematic diagram of a second housing according to the present disclosure.

In a specific implementation, for the case of a plurality of ink cartridges 1, the second housing 203 is wrapped around the outside of each ink cartridge 1, or several adjacent ink cartridges 1 are wrapped with a second housing 203 as shown in FIG. 2. As shown in FIG. 7, the second housing 203 only encloses a portion below the side wall of the ink cartridge 1 other than the first region 101, such that the second housing 203 does not overlap with the first region 101. The sealing film 205 is wrapped around the outside of the second housing 203.

The ink cartridge packaging assembly 2 further comprises the second housing 203 for enclosing and fixing one or more ink cartridges 1, and the second housing 203 only encloses the position below the first region 101 on the side wall of the ink cartridge 1.

The gap between the sealing film 205 and the first region 101 is not less than 1 mm; preferably, the gap between the sealing film 205 and the first region 101 is between 1.5 mm and 3 mm.

Figure 3:
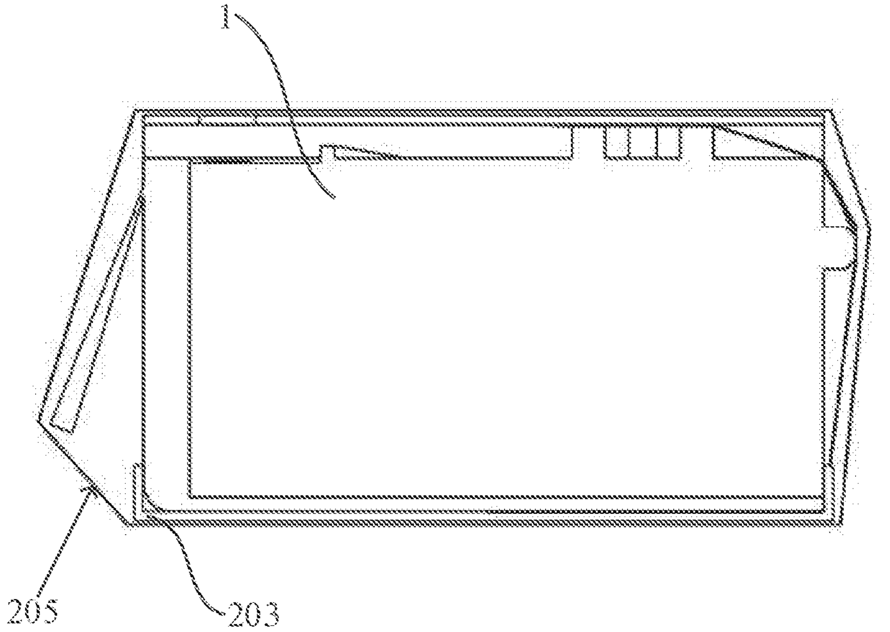
FIG. 3 shows a structural schematic diagram of a second housing with a sealing film according to the present disclosure.
Figure 4:
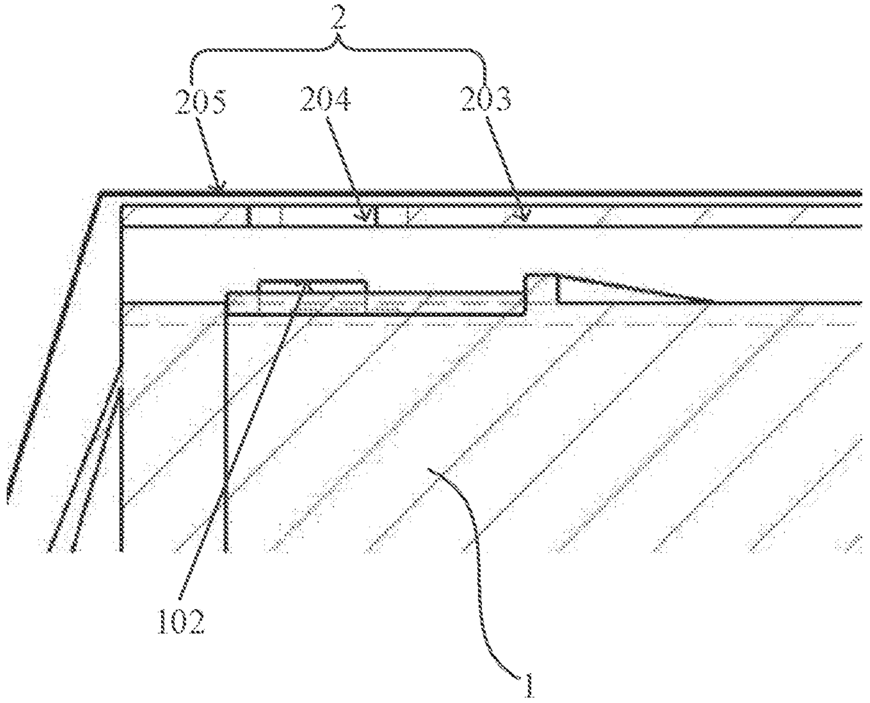
FIG. 4 shows a structural schematic diagram of a second housing with a sealing film according to the present disclosure.
Figure 5:
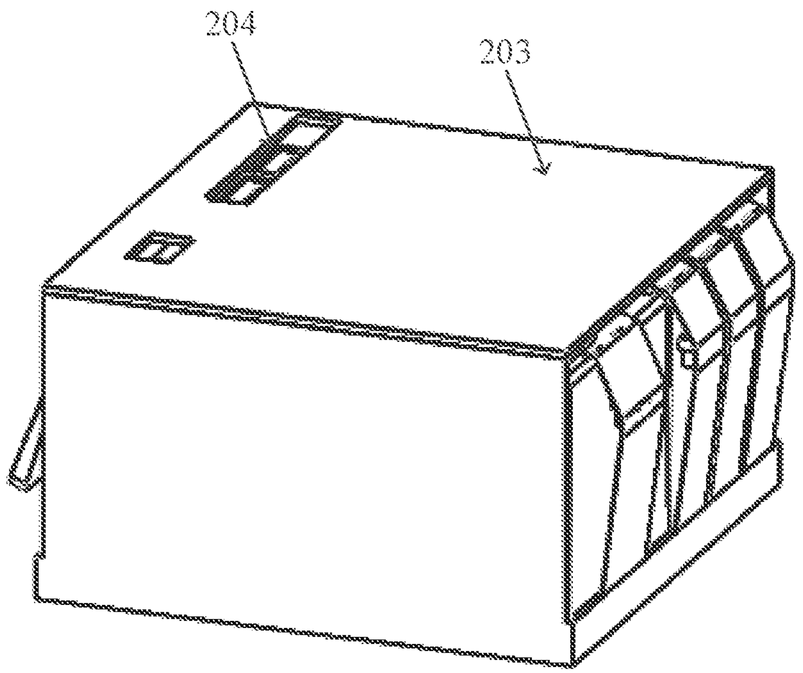
FIG. 5 shows a structural schematic diagram of a second housing according to the present disclosure.
Figure 6:
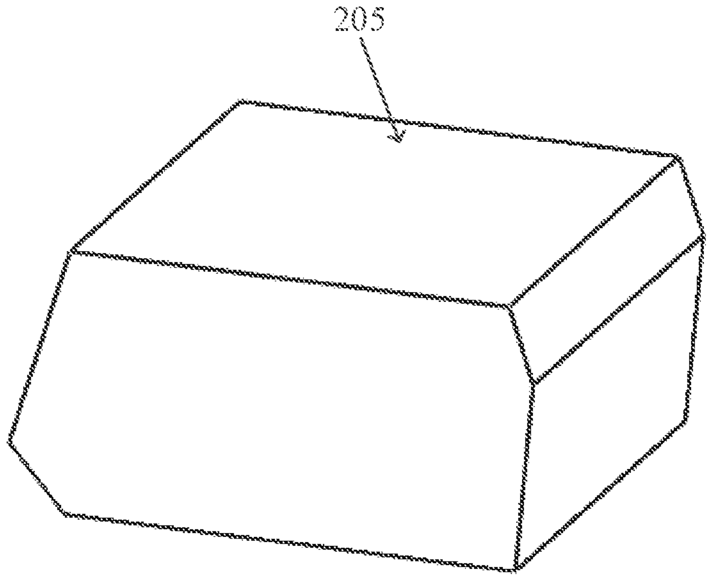
FIG. 6 shows a structural schematic diagram with a sealing film according to the present disclosure.

When the first region 101 on the surface of the ink cartridge 1 is at the same level with the other regions on the surface of the ink cartridge 1, the ink cartridge 1 is loaded into the second housing 203, and then the sealing film 205 is used to seal and package the second housing 203: when the first region 101 on the surface of the ink cartridge 1 is lower than the other regions on the surface of the ink cartridge 1, the sealing film 205 may be used to directly seal and package the ink cartridge 1, or the ink cartridge 1 may be loaded into the second housing 203 and then the ink cartridge 1 and the second housing 203 may be sealed and packaged together. As shown in FIG. 6, the ink cartridge 1 is sealed and packaged with the sealing film 205 to prevent the ink cartridge 1 from leaking ink and contaminating other ink cartridges 1 during storage or transportation. As shown in FIG. 3 and FIG. 4, there is a gap between the sealing film 205 and the first region 101, and the gap is not less than 2 mm, so as to ensure that when the ink cartridge 1 is installed in the packaging box to upgrade the chip of the ink cartridge 1, the probe module 3 is able to pierce the sealing film 205 to contact the conductive plate 102 inside the first region 101, thereby improving the success rate of contact.

The sealing film 205 is a heat shrinkable film.

The heat shrinkable film is selected as the sealing film 205 to simplify the process while improving the sealing efficiency of the sealing film 205 when packaging the first housing 201 or the second housing 203 or the ink cartridge 1.

The heat shrinkable film is a POF film.

The POF film is a transparent film, which is convenient for observing the preservation status of the ink cartridge 1 within the POF film. And the POF film has the advantages of low cost, uniform thickness, good moisture resistance performance, good sealing performance, soft texture, high tensile strength, good cold resistance, and easy processing, etc.

The present disclosure also provides an ink cartridge 1 assembly, the ink cartridge 1 assembly comprises an ink cartridge 1 and an ink cartridge packaging assembly 2 as described above, and the ink cartridge 1 is loaded in the ink cartridge packaging assembly 2.

The ink cartridge 1 assembly comprises the ink cartridge 1 and the ink cartridge packaging assembly 2. In the actual production process, after the ink cartridge 1 is produced, the ink cartridge 1 is first used to enclose and fix the second housing 203, then the second housing 203 and the ink cartridge 1 as a whole are sealed and packaged with the POF film, and put into the first housing 201 together with the instructions. Herein, the first housing 201 and the second housing 203 are respectively provided with a first opening 202 and a second opening 204, and both the first opening 202 and the second opening 204 are disposed opposite the first region 101 on the surface of the ink cartridge 1, such that when the chip inside the ink cartridge 1 needs to be upgraded, the probe module 3 is used to pierce the POF film to contact the conductive plate 102 in the first region 101 on the surface of the ink cartridge 1, so as to upgrade the on-chip program. There is no need to take the ink cartridge 1 out of the first housing 201 and the second housing 203, which saves on labor costs and time costs.

Figure 11:
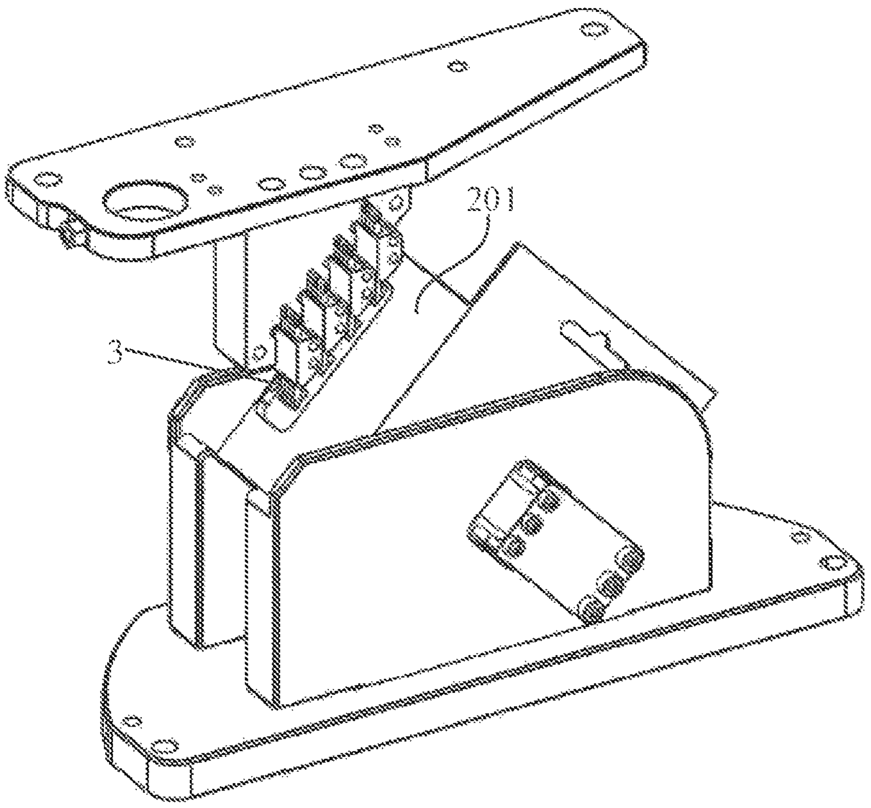
FIG. 11 shows a structural schematic diagram of a probe module obliquely piercing a sealing film according to the present disclosure.
Figure 12:
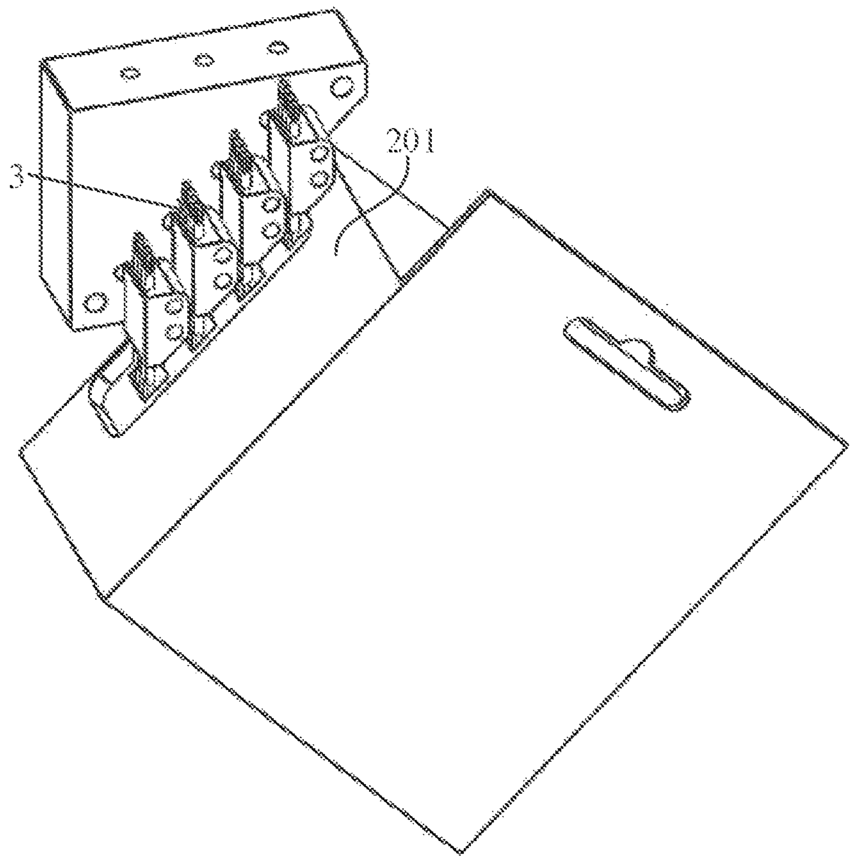
FIG. 12 shows a structural schematic diagram of a probe module obliquely piercing a sealing film according to the present disclosure.
Figure 13:
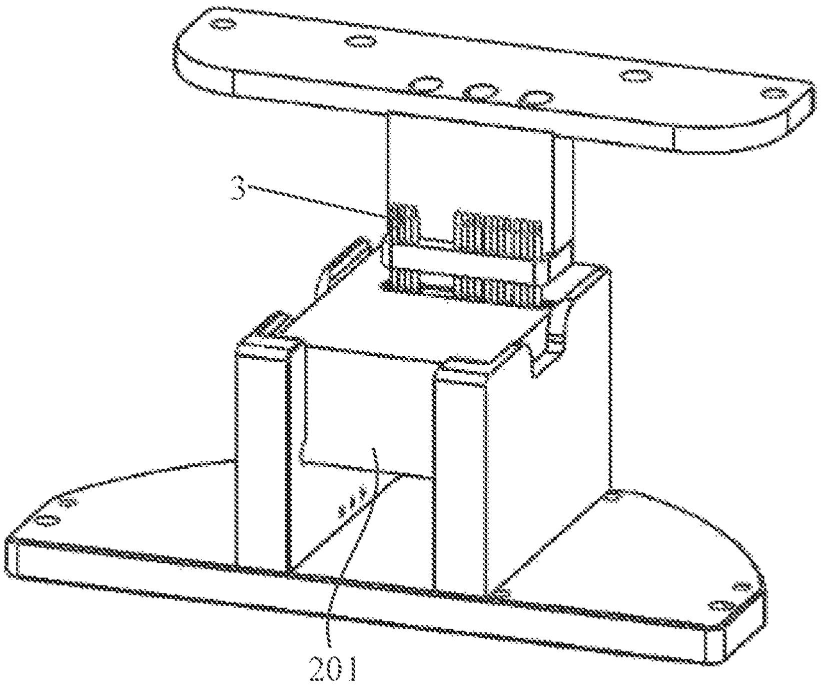
FIG. 13 shows a structural schematic diagram of a probe module vertically piercing a sealing film according to the present disclosure.
Figure 14:
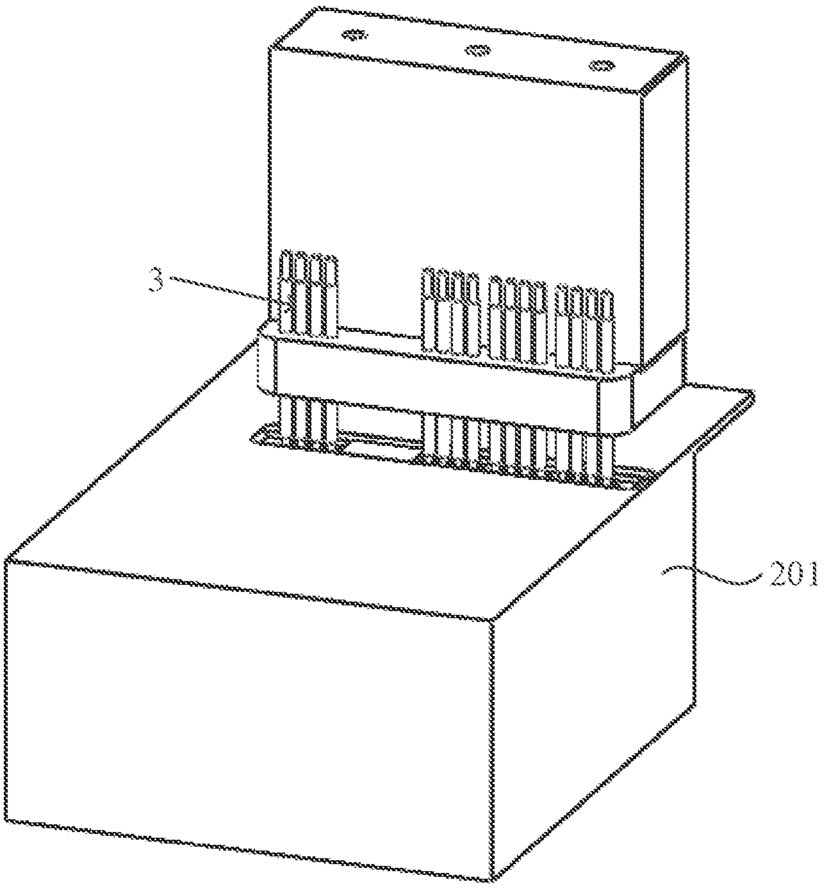
FIG. 14 shows a structural schematic diagram of a probe module vertically piercing a sealing film according to the present disclosure.

As shown in FIG. 11 and FIG. 12, the probe module 3 may obliquely pierce the POF film to connect to the conductive plate 102 during the upgrade. As shown in FIG. 13 and FIG. 14, the probe module 3 may also vertically pierce the POF film to connect to the conductive plate 102.

Embodiment 2

The parts of Embodiment 2 that are the same as those of Embodiment 1 will not be repeated, and only the different parts will be described. In Embodiment 1, there is one first opening 202, and in Embodiment 2, there are a plurality of first openings 202.

The accommodating cavity accommodates several ink cartridges 1, and a plurality of the first regions 101 are disposed opposite several first openings 202. Herein, the number of the first openings 202 may be the same as the number of the first regions 101, and the first openings 202 are disposed in one-to-one correspondence with the first regions 101. Alternatively, as shown in FIG. 1, the number of the first openings 202 may be less than the number of the first regions 101, and some of the first openings 202 correspond to a plurality of first regions 101.

The accommodating cavity accommodates several ink cartridges 1, the several ink cartridges 1 are arranged side by side in the accommodating cavity of the first housing 201, and the first regions 101 of the several ink cartridges 1 are arranged side by side. The first housing 201 is provided with a plurality of first openings 202, the plurality of first openings 202 are disposed in one-to-one correspondence with the first regions 101 of a plurality of ink cartridges 1, respectively, and the area of the first opening 202 is slightly larger than the area of the first region 101.

Embodiment 3

The parts of Embodiment 3 that are the same as those of Embodiment 1 will not be repeated, and only the different parts will be described. In Embodiment 1, the second housing 203 only encloses the side wall of the ink cartridge 1, and in Embodiment 3, the second housing 203 encloses the entire ink cartridge 1.

As shown in FIGS. 2-5 and FIGS. 8-10, the second housing 203 is provided with a second opening 204, the second opening 204 is in communication with the inside of the second housing 203, and the second opening 204 is disposed opposite the first region 101.

The ink cartridge packaging assembly further comprises at least one second housing 203, the second housing 203 is disposed in the accommodating cavity, and the second housing 203 is wrapped around the outside of the ink cartridge 1. And the second housing 203 is provided with a second opening 204, and the second opening 204 is disposed opposite the first region 101 of the ink cartridge 1, such that when the built-in program of the ink cartridge 1 is upgraded, the device can be electrically connected to the first region 101 through the first opening 202 and the second opening 204 to realize the upgrade without taking the ink cartridge 1 out of the first housing 201 and the second housing 203, thereby saving on labor costs and time costs.

Although the specific embodiments of the present disclosure have been described above, it should be understood by those skilled in the art that these are merely illustrative examples and that the scope of protection of the present disclosure is limited by the appended claims. A variety of changes or modifications can be made by those skilled in the art to these embodiments without departing from the principles and substance of the present disclosure, but these changes and modifications all fall within the scope of protection of the present disclosure.

What is claimed is:

1. An ink cartridge packaging assembly, with a surface of the ink cartridge having a first region, the ink cartridge packaging assembly comprising a first housing and a sealing film, the first housing being internally provided with an accommodating cavity for accommodating at least one of the ink cartridges, wherein the first housing is provided with at least one first opening, the first opening is in communication with the accommodating cavity, the first opening is disposed opposite the first region, the sealing film is sealed and wrapped around the outside of the ink cartridge and located inside the first housing, there is a gap between the sealing film and the first region, and the ink cartridge packaging assembly further comprises at least one second housing.

2. The ink cartridge packaging assembly as claimed in claim 1, wherein the accommodating cavity accommodates several ink cartridges, and each of the first openings is disposed opposite at least one of the first regions.

3. The ink cartridge packaging assembly as claimed in claim 2, wherein the ink cartridge packaging assembly further comprises at least one second housing, the second housing is disposed in the accommodating cavity, and the second housing is wrapped around the outside of at least one of the ink cartridges; the second housing does not overlap with the first region on the surface of the ink cartridge, and the sealing film is wrapped around the outside of the second housing.

4. The ink cartridge packaging assembly as claimed in claim 3, wherein the second housing is provided with a second opening, the second opening is in communication with the inside of the second housing, and the second opening is disposed opposite the first region.

5. The ink cartridge packaging assembly as claimed in claim 1, wherein the second housing is disposed in the accommodating cavity, and the second housing is wrapped around the outside of at least one of the ink cartridges; the second housing does not overlap with the first region on the surface of the ink cartridge, and the sealing film is wrapped around the outside of the second housing.

6. The ink cartridge packaging assembly as claimed in claim 5, wherein the second housing is provided with a second opening, the second opening is in communication with the inside of the second housing, and the second opening is disposed opposite the first region.

7. The ink cartridge packaging assembly as claimed in claim 1, wherein the gap between the sealing film and the first region is not less than 1 mm.

8. The ink cartridge packaging assembly as claimed in claim 7, wherein the gap between the sealing film and the first region is 1.5 mm to 3 mm.

9. The ink cartridge packaging assembly as claimed in claim 1, wherein the sealing film is a heat shrinkable film.

10. The ink cartridge packaging assembly as claimed in claim 9, wherein the heat shrinkable film is a POF film.

11. An ink cartridge assembly, wherein, the ink cartridge assembly comprising an ink cartridge and the ink cartridge packaging assembly as claimed in claim 1, and the ink cartridge is loaded in the ink cartridge packaging assembly.

12. The ink cartridge assembly as claimed in claim 11, wherein the first region is provided with a conductive plate, and the conductive plate is connected to a chip inside the ink cartridge.

* * * * *